(12) United States Patent
Dianda

(10) Patent No.: US 7,106,741 B2
(45) Date of Patent: Sep. 12, 2006

(54) ESTABLISHING COMMUNICATION PATHS TO LAW ENFORCEMENT AGENCIES

(75) Inventor: Robert B. Dianda, Leawood, KS (US)

(73) Assignee: Lucent Technologies Inc., Murray Hill, NJ (US)

( * ) Notice: Subject to any disclaimer, the term of this patent is extended or adjusted under 35 U.S.C. 154(b) by 958 days.

(21) Appl. No.: 10/067,158

(22) Filed: Feb. 4, 2002

(65) Prior Publication Data

US 2003/0147397 A1   Aug. 7, 2003

(51) Int. Cl.
*H04L 12/28*   (2006.01)
*H04L 12/56*   (2006.01)
*H04M 11/04*   (2006.01)

(52) U.S. Cl. .................. 370/393; 370/395.2; 379/37

(58) Field of Classification Search ............... 370/352, 370/329, 470, 219, 397, 474, 351, 395, 395.2, 370/393, 354; 379/114, 386, 372, 418, 37, 379/45; 709/227, 238; 348/14.01, 37, 39, 348/40, 143, 153
See application file for complete search history.

(56) References Cited

U.S. PATENT DOCUMENTS

| | | | |
|---|---|---|---|
| 5,774,465 A * | 6/1998 | Lau et al. | 370/395.3 |
| 6,118,793 A * | 9/2000 | Chen | 370/470 |
| 6,577,718 B1 * | 6/2003 | Kalmanek et al. | 379/114.22 |
| 6,597,657 B1 * | 7/2003 | Tanaka | 370/219 |
| 7,019,770 B1 * | 3/2006 | Katz | 348/14.01 |
| 2002/0131377 A1 * | 9/2002 | DeJaco et al. | 370/329 |
| 2002/0176404 A1 * | 11/2002 | Girard | 370/352 |
| 2005/0243973 A1 * | 11/2005 | Laliberte | 379/37 |

* cited by examiner

*Primary Examiner*—Chi Pham
*Assistant Examiner*—Prenell Jones

(57) ABSTRACT

A call is set up between a first communication device (101) and a second communication device (115) on a first communication path (117), via an asynchronous transfer mode (ATM) network (105). A second communication path (203) is established from the ATM network (105) to a law enforcement agency (201), which second communication path comprises audio sourced by the first communication device (101) on the first communication path (117). A third communication path (205) is established from the ATM network (105) to the law enforcement agency (201), which third communication path (205) comprises audio sourced by the second communication device (115) on the first communication path (117). The audio sourced by the first communication device (101) and the audio sourced by the second communication device (115) are replicated by an ATM switch (107) in the ATM network (105).

18 Claims, 3 Drawing Sheets

- PRIOR ART -

ESTABLISHING COMMUNICATION PATHS TO LAW ENFORCEMENT AGENCIES

FIELD OF THE INVENTION

This invention relates to communication systems, including but not limited to monitoring of communication lines.

BACKGROUND OF THE INVENTION

The Communications Assistance for Law Enforcement Act (CALEA) sets forth standards by which telecommunications providers assist law enforcement agencies (LEAs) surveillance activities. When an LEA has obtained a court order authorizing a wiretap for a target's directory number, a telecommunications provider is required to provide an unobtrusive, i.e., not noticeable by the target, wiretap of all calls initiated by or directed to the target's directory number.

At times, a single switch may support numerous targets, and further, those targets may be targeted by multiple LEAs. If there are five LEAs and each LEA requires a tap for both the talking path to the target and the talking path from the target, and if, for example, there are 25 targets on the switch, reserving lines for each of the wiretaps required for this circumstance would take 250 lines, thereby taking up a significant percentage of the switch resources. If a high-traffic situation, such as an emergency, occurred during this time period, there may not be sufficient resources to handle the situation.

Accordingly, there is a need for a method and apparatus for supporting LEA activities without burdening switch resources.

SUMMARY

An access gateway comprises a processor arranged and constructed to set up a call path between at least two communication devices, including a first communication device and a second communication device, via one or more asynchronous transfer mode (ATM) switches. The access gateway instructs one of the one or more ATM switches to replicate audio sourced by at least one of the at least two communication devices and to route the replicated audio to at least one law enforcement agency.

DESCRIPTION OF A PREFERRED EMBODIMENT

The following describes an apparatus for and method of providing replicated audio for target users to law enforcement agencies. The call is established over an asynchronous transfer mode (ATM) switch network. One of the ATM switches is instructed to replicate audio in an unobtrusive manner to the target users. Replication of audio is also provided to multiple LEAs and for calls placed when calls are on hold.

Figure 1:
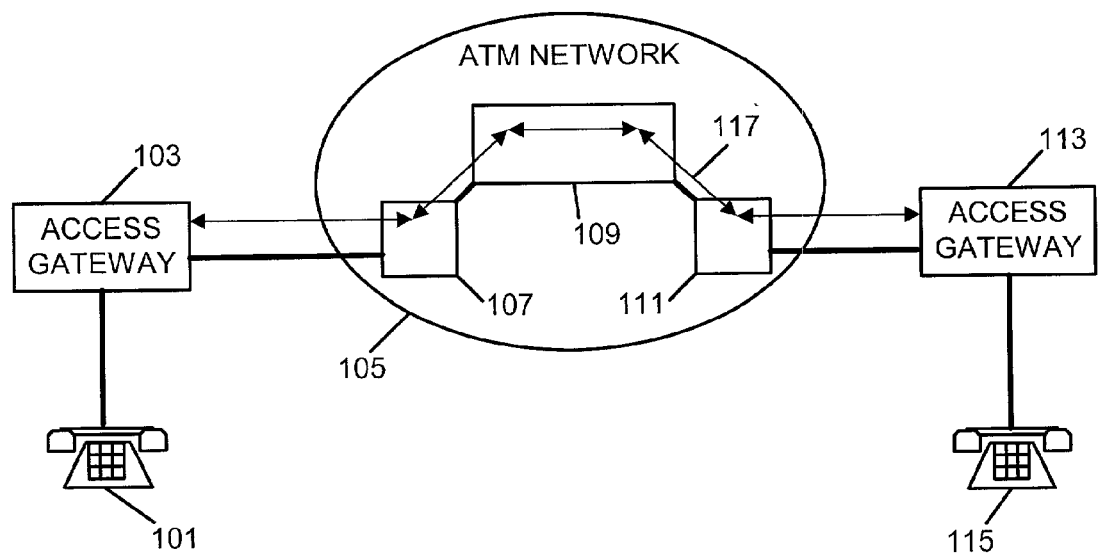
FIG. 1 is a block diagram of a communication system utilizing an ATM switch to set up a call.

FIG. 1 illustrates connections made for a call from a first user to a second user via an ATM network, as known in the art. The first user is associated with a first communication device 101 that is operably coupled, directly or indirectly, to an access gateway (AG) 103. The AG 103 is operably coupled with an ATM network 105 that is comprised of a plurality of switches 107, 109, and 111. Although only three switches are show for the sake of simplicity, any number of switches may be present. The ATM network 105 is a packet-based switching network that performs data protocols and services. The ATM switches 107, 109, and 111 perform functions such as replication and general call set up, as instructed, although the ATM switches 107, 109, and 111 may not support call features such as call forwarding or voice mail. ATM switches are typically high-bandwidth, low-delay, packet-switched devices. Q2931 and UNI 4.0 are standards that set forth call control signaling for ATM.

A second access gateway 113 is operably coupled to the ATM network 105 and a communication device 115 associated with the second user. A bi-directional call path 117 for the call between the two users is shown between the AGs 103 and 113. The call is typically set up by one AG using the address of the other AG. For example, one AG may be instructed to set up an ATM connection to the other AG, for which an address is given. The AG sends the address of the other AG in a call control message to the ATM switch associated with the AG.

Figure 2:
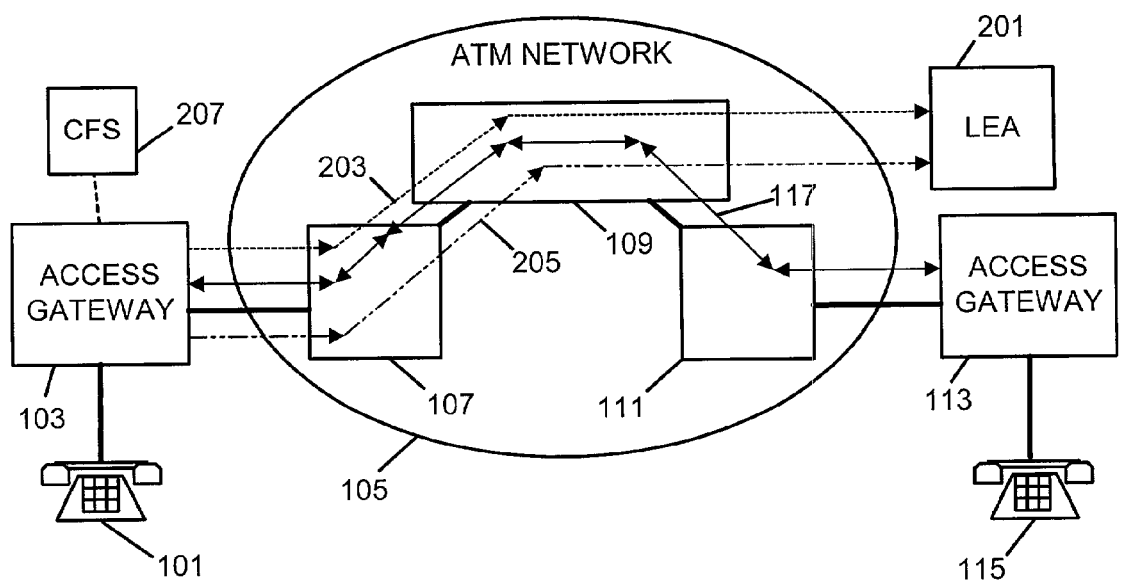
FIG. 2 is a block diagram of a communication system utilizing an ATM switch to set up a call and establish paths to an LEA in accordance with the invention.

Call paths 203 and 205 to a law enforcement agency (LEA) 201 for the call set up over the call path 117 are shown in FIG. 2. A call may be set up by instructions generated by an AG 103 or optionally by a CFS (Call Feature Server) 207 that instructs the AGs 103 and 113 on how to set up the call, including replication instructions to the ATM network 105 for the LEA 201. The CFS 207 may operate via an MGC (not shown), e.g., using H.248 protocols, to the AG 103.

The call set-up involves establishing two additional call paths 203 and 205 to the LEA. These call paths need only be unidirectional call paths, although bidirectional paths would operate successfully, even though they would be wasteful of resources. The first path 203 replicates audio sourced by the first user's communication device 101, and the second path 205 replicates audio sourced by the second user's communication device 115. Ideally, these lines or paths 203 and 205 are created such that they provide unobtrusive monitoring of the desired audio, i.e., the user would be unaware of the paths 203 or 205. For example, no delay in audio processing, change in audio quality, or significant signal losses would be detectable under normal circumstances. The call set-up device, be it a CFS, AG, or other device, has the LEA 201 requirements for wiretaps stored, including the directory number for users targeted by the LEA 201.

The AGs 103 and 113 contain one or more processors that generally perform voice processing, e.g., voice packetization/de-packetization and echo cancellation or control. The AGs 103 and 113 may be line access gateways (LAGs), that handle ISDN (Integrated Services Digital Network) or POTS (Plain Old Telephone Service) lines, or trunked access gateways (TAGs) that handle TDM (Time Division Multiplexed) trunks. The AGs 103 and 113 may provide the function of a call set-up device. The call set-up device directs the various components, e.g., the ATM switches 107, 109, and 111, to establish call paths for the original call and monitoring paths to the LEAS, replicate audio as necessary, tear down any bridges, and release the call paths when the call is over.

Figure 3:
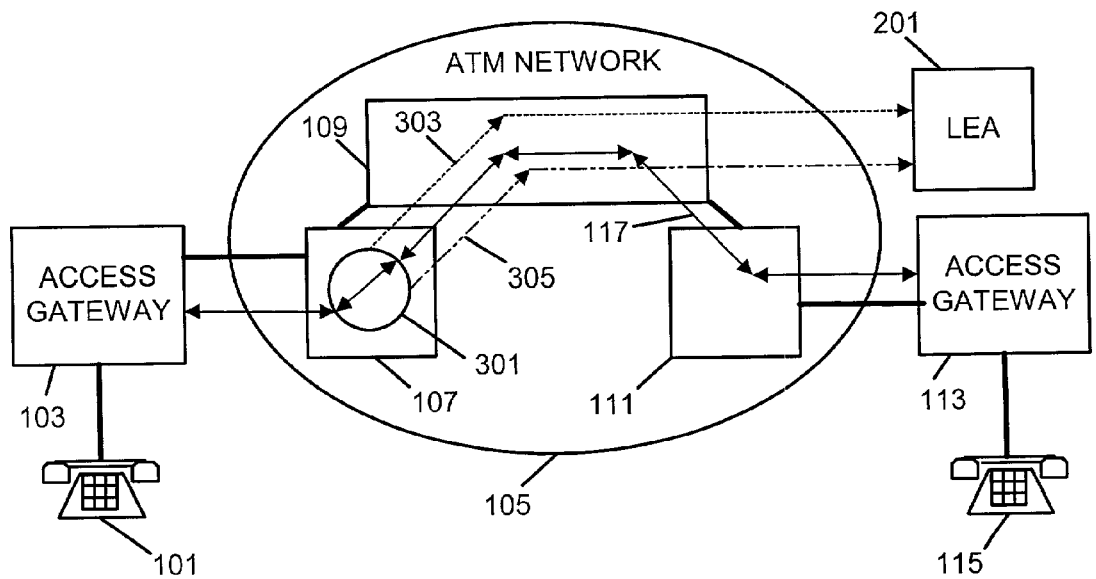
FIG. 3 is a block diagram of a communication system utilizing an ATM switch to replicate audio to send on established paths to an LEA in accordance with the invention.

Once call paths 203 and 205 are established to the LEA 201, the legs or segments of the call paths from the AG 103 to the first switch 107 of the ATM network 105, which legs or segments are used as a bridge to set up the call, may be torn down once the ATM switch 107 is set up to perform replication of the call's audio to the LEA 201, as shown in FIG. 3. A replicator 301 is a part of the switch, and may be a separate physical device or a software routine implemented as part of the switches 107, 109, and 111. The call set-up device instructs the paths to be joined, i.e., the original call 117 and the unidirectional paths 203 and 205 are connected. The switch 107 is instructed to perform replication and join the lines 117, 203, and 205. Once the join is performed and replication begins, the bridges, i.e., the legs or segments of the call paths 203 and 205 of FIG. 2 from the AG 103 to the switch 107/replicator 301, may be dropped or torn down, thereby saving AG 103 resources for other calls. The LEA 201 is able to hear the audio from both users once replication begins. Current standards call for replication of audio at the AG, thus do not require replication at the ATM switch and do not allow for the bridges to be torn down. As a result, the present embodiments allow for more efficient resource utilization because the resources utilized for these bridges may be reused once replication begins. Replication at the AG requires the bridges to be used for the wire taps to the LEA 201.

Figure 4:
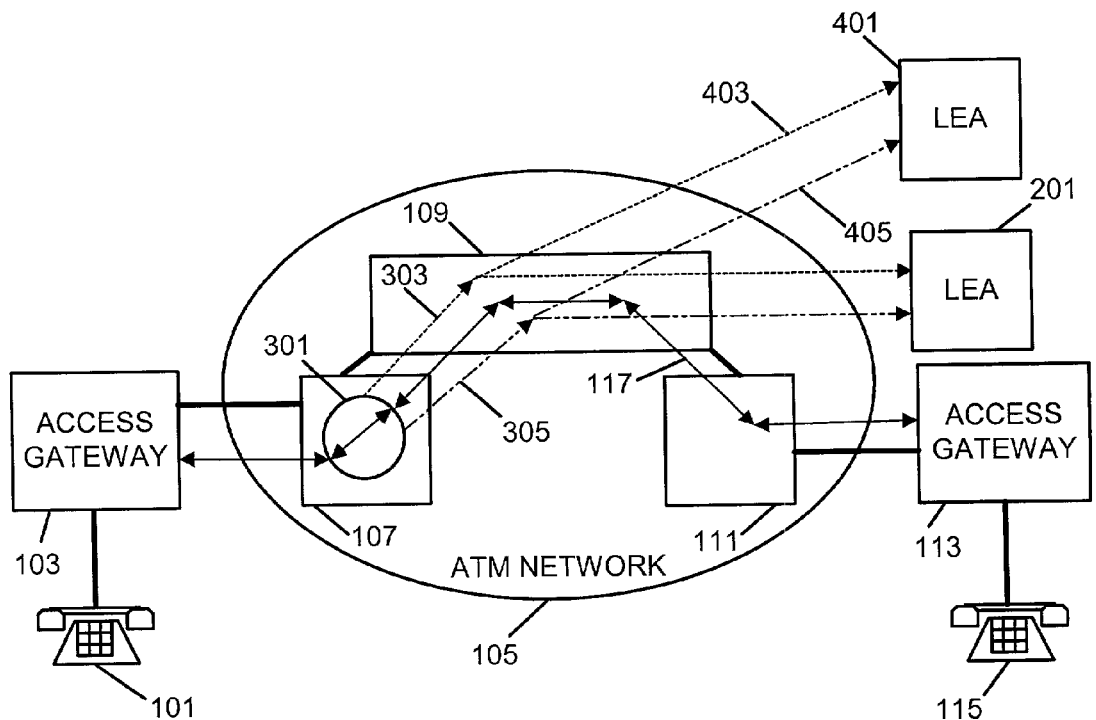
FIG. 4 is a block diagram of a communication system utilizing an ATM switch to set up a call and establish paths to multiple LEAs in accordance with the invention.

In the event a second LEA 401 has targeted the same user that the first LEA 201 targeted, additional paths 403 may be set up to accommodate the second LEA 401 as shown in FIG. 4. Typically, LEAs 201 and 401 are independent and require independent wire taps. These additional wire taps 403 and 405 may be provided from the same replicator 301 as the first LEA 201 or may be replicated by another switch 109, e.g., one more local to the second LEA 401. The paths to the LEAs 201 and 401 may be point-to-multipoint connections. Any number of LEAs may be added to the call in this way.

Figure 5:
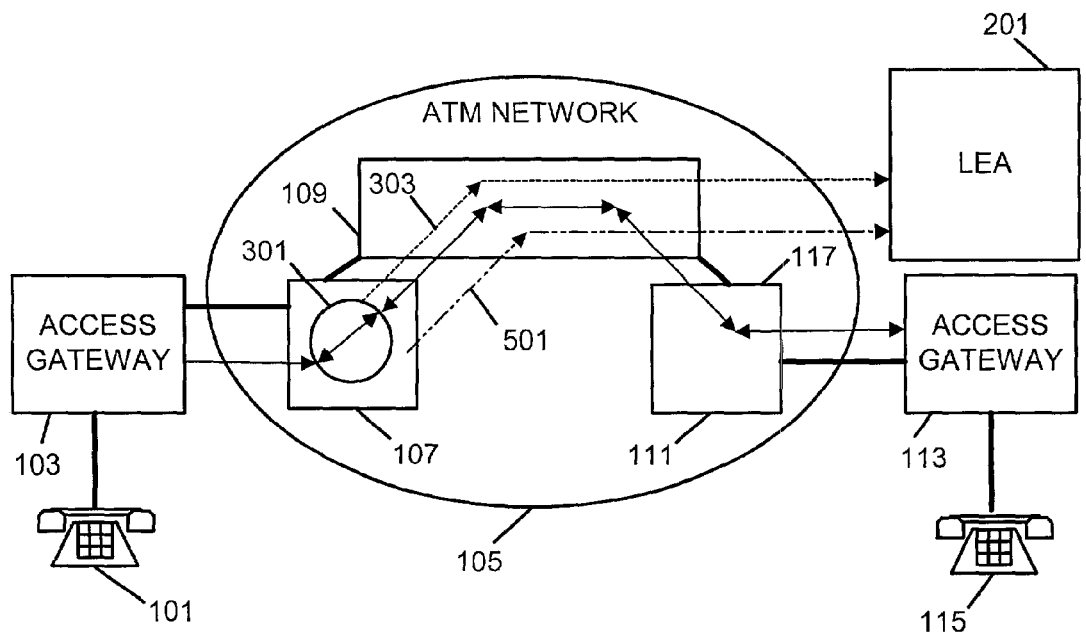
FIG. 5 is a block diagram of a communication system utilizing an ATM switch to set up a call with established paths to an LEA and put the call on hold in accordance with the invention.
Figure 6:
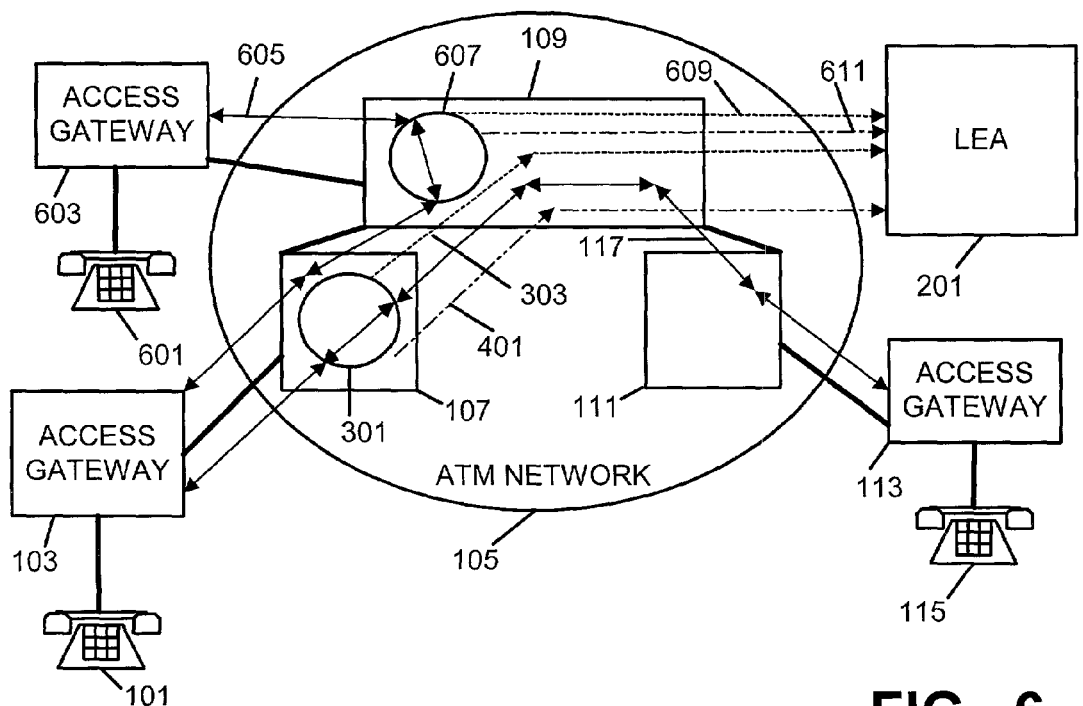
FIG. 6 is a block diagram of a communication system utilizing an ATM switch to set up two calls with established paths to an LEA in accordance with the invention.

Under various laws, LEAs may not be permitted to monitor audio from a non-target user while a call is placed on hold by one of the parties. In this situation, the first user is separated from the replicator 301 as shown in FIG. 5, although the path 501 may remain intact to the LEA 201, otherwise, e.g., in case the first user resumes the call with the second user. When the call is placed on hold by a party, the LEA 201 is disengaged from the call path. Such a process may take place, for example, by an AG 103 instructing the ATM switch to disengage communications. When the call is retrieved from hold by the party, the LEA 201 is re-engaged to the call path. Such a process may take place, for example, by an AG 103 instructing the ATM switch to reengage communications on the previous path (or even a different path as needed or desired). The present invention may be utilized to provide audio from either party when calls are placed on hold, if these laws change their requirements.

While the first user has placed a call 117 with the second user 117 on hold, the first user may wish to place another call to a third user. The third user is associated with a third communication device 601 that is operably coupled to the ATM network 105 through a third AG 603. This second call is established via a path 605 through the third AG 603. As before, a replicator 607 is set up to replicate audio to the LEA 201 via two unidirectional paths 609 and 611. These paths may be new paths or may be the same paths 303 and 305 to the LEA 201 as were used in the call to the first user. The replicator 607 may be the same replicator 301 that was used for the first call (not shown).

The examples shown in the drawings show the situations where different AGs handle each user. For any given call, the AG may be the same AG for both parties, or may be different for both parties, or when more than two parties are joined, and number of different AGs up to the number of parties may be utilized, without affecting successful practice of the invention.

The teachings herein provide the advantage of supporting LEA activities without burdening switch resources. Calls are established over an ATM switch network, and one of the ATM switches unobtrusively (to target users) replicates audio for one of more LEAs, and handles replication and other issues for calls placed on hold and retrieved from hold.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A method comprising the steps of:
    setting up a call on a first communication path, via an asynchronous transfer mode (ATM) network, between a first communication device and a second communication device;
    establishing a second communication path from the ATM network to a law enforcement agency, the second communication path comprises audio sourced by the first communication device on the first communication path;
    establishing a third communication path from the ATM network to the law enforcement agency, the third communication path comprises audio sourced by the second communication device on the first communication path;
    wherein the audio sourced by the first communication device and the audio sourced by the second communication device are replicated by an ATM switch in the ATM network, and
    wherein when the call is placed on hold by the first communication device, disengaging the law enforcement agency from the third communication path.

2. The method of claim 1, wherein the step of setting up further comprises the step of instructing the ATM switch to replicate the audio sourced on the first path.

3. The method of claim 1, wherein the second communication path and the third communication path are unidirectional paths sourced by the ATM switch.

4. The method of claim 1, wherein the steps of establishing are performed unobtrusively to the first communication path.

5. The method of claim 1, further comprising the step of sending the audio replicated by the ATM switch to a second law enforcement agency.

6. The method of claim 1, further comprising the step of tearing down a path between the ATM network and a first access gateway that serves the first communication device once the second communication path and the third communication path are established.

7. The method of claim 1, further comprising the step of, when the call is placed on hold by the first communication device, disengaging the law enforcement agency from the third communication path by an instruction sent from a first access gateway to the ATM switch.

8. The method of claim 1, further comprising the step of, when the call is retrieved from hold by the first communication device, re-engaging the law enforcement agency from the third communication path by an instruction sent from a first access gateway to the ATM switch.

9. The method of claim 1, further comprising the steps of, when the first communication device places a call to a third communication device:
setting up a fourth communication path, via the ATM network, between the first communication device and the third communication device;
establishing a fifth communication path from the ATM network to a law enforcement agency, the fifth communication path comprises audio sourced by the first communication device on the fourth communication path;
establishing a sixth communication path from the ATM network to the law enforcement agency, the sixth communication path comprises audio sourced by the third communication device on the fourth communication path;
wherein the audio sourced by the first communication device and the audio sourced by the third communication device are replicated by a second ATM switch in the ATM network.

10. A method comprising the steps of:
setting up a first call, via an asynchronous transfer mode (ATM) network, between a first communication device and a second communication device;
establishing a first communication path from the ATM network to a law enforcement agency, the first communication path comprises audio sourced by the first communication device during the call;
establishing a second communication path from the ATM network to the law enforcement agency, the second communication path comprises audio sourced by the second communication device during the call;
when the first call is placed on hold by the first communication device and the first communication device places a second call to a third communication device, performing the steps of:
setting up the second call, via the ATM network, between the first communication device and the third communication device;
establishing a third communication path from the ATM network to the law enforcement agency, the third communication path comprises audio sourced by the first communication device during the second call;
establishing a fourth communication path from the ATM network to the law enforcement agency, the fourth communication path comprises audio sourced by the third communication device during the call;
wherein the audio sourced by the first communication device, the second communication device, and the third communication device is replicated by one or more ATM switches.

11. The method of claim 10, wherein the step of setting up further comprises the step of instructing the ATM switch to replicate the audio sourced on the first path.

12. The method of claim 10, further comprising the step of sending the audio replicated by the ATM switch to a second law enforcement agency.

13. The method of claim 10, further comprising the step of, when the first call is placed on hold by the first communication device, disengaging the law enforcement agency from the second communication path.

14. The method of claim 10, wherein the first communication path, the second communication path, the third communication path, and the fourth communication path are unidirectional communication paths.

15. An access gateway comprising a processor arranged and constructed to set up a call path between at least two communication devices, including a first communication device and a second communication device, via one or more asynchronous transfer mode (ATM) switches and to instruct one of the one or more ATM switches to replicate audio sourced by at least one of the at least two communication devices and to route the replicated audio to at least one law enforcement agency, and when the call is placed on hold by the first communication device, the access gateway discontinues sending replicated audio to the law enforcement agency.

16. The access gateway of claim 15, wherein the processor is further arranged and constructed to establish at least one unidirectional path to the at least one law enforcement agency.

17. The access gateway of claim 15, wherein the processor is further arranged and constructed to tear down at least a part of the call path once replicated audio is routed to the at least one law enforcement agency.

18. The access gateway of claim 15, wherein the processor is further arranged and constructed to establish a call between the first communication device and a third communication device via the one or more ATM switches and to instruct one of the one or more ATM switches to replicate audio sourced by at least one of the at least two communication devices, including the third communication device, and to route the replicated audio to at least one law enforcement agency.

* * * * *